United States Patent
Chen et al.

(10) Patent No.: US 8,303,930 B2
(45) Date of Patent: *Nov. 6, 2012

(54) PROCESSES FOR THE RECOVERY OF HIGH PURITY HYDROGEN AND HIGH PURITY CARBON DIOXIDE

(75) Inventors: Yudong Chen, Garnet Valley, PA (US); Glenn Fair, Katy, TX (US)

(73) Assignees: American Air Liquide, Inc., Fremont, CA (US); Air Liquide Industrial U.S. LP, Houston, TX (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/570,346

(22) Filed: Sep. 30, 2009

(65) Prior Publication Data
US 2010/0288123 A1    Nov. 18, 2010

Related U.S. Application Data

(60) Provisional application No. 61/179,225, filed on May 18, 2009.

(51) Int. Cl.
*B01D 53/02* (2006.01)

(52) U.S. Cl. ............... 423/655; 95/96; 95/116; 95/117; 95/139; 95/140; 95/143; 96/121; 422/612; 422/620; 422/626

(58) Field of Classification Search ........... 95/45, 51, 95/55, 56, 95, 96, 116, 139, 148; 96/4, 108, 96/131, 132, 133, 136, 143; 423/418.2, 437, 423/1, 2, 648, 655; 62/619
See application file for complete search history.

(56) References Cited

U.S. PATENT DOCUMENTS

| | | | |
|---|---|---|---|
| 4,836,833 A | 6/1989 | Nicholas et al. | |
| 4,952,223 A | 8/1990 | Kirshnamurthy et al. | |
| 4,963,339 A * | 10/1990 | Krishnamurthy et al. . | 423/437.2 |

(Continued)

FOREIGN PATENT DOCUMENTS

WO     2006054008     5/2006

(Continued)

OTHER PUBLICATIONS

PCT Search Report and Written Opinion for PCT/US2010/034887.

(Continued)

*Primary Examiner* — Duane Smith
*Assistant Examiner* — Minh-Chau Pham
(74) *Attorney, Agent, or Firm* — Elwood L. Haynes (57) ABSTRACT

The present invention relates to various processes for recovering high purity gaseous hydrogen and high purity gaseous carbon dioxide from the gas stream produced using steam hydrocarbon reforming, especially steam methane reforming, utilizing a $H_2$ pressure swing adsorption unit followed by either a $CO_2$ vacuum swing adsorption unit or a $CO_2$ vacuum swing adsorption unit in combination with an additional $CO_2$ pressure swing adsorption unit. By using an uncoupled $H_2$ PSA and $CO_2$ VSA unit it is possible to produce high purity $H_2$ and high purity $CO_2$. The present invention further relates to a process for optimizing the recovery of $CO_2$ from waste gas streams produced during the hydrogen purification step of a steam hydrocarbon reforming/$H_2$ pressure swing adsorption unit utilizing either a $CO_2$ vacuum swing adsorption unit or a $CO_2$ vacuum swing adsorption unit in combination with a $CO_2$ pressure swing adsorption unit. The present invention even further relates to the apparatus necessary to carry out the various processes of the present invention.

14 Claims, 2 Drawing Sheets

U.S. PATENT DOCUMENTS

| | | | |
|---|---|---|---|
| 5,000,925 A | 3/1991 | Krishnamurthy et al. | |
| 5,152,976 A * | 10/1992 | Fong et al. | 423/652 |
| 5,435,836 A * | 7/1995 | Anand et al. | 95/45 |
| 5,669,960 A * | 9/1997 | Couche | 95/96 |
| 5,927,103 A | 7/1999 | Howard | |
| 6,669,916 B2 | 12/2003 | Heim et al. | |
| 7,745,502 B2 * | 6/2010 | Lowe et al. | 518/709 |
| 8,057,773 B2 * | 11/2011 | MacArthur et al. | 423/437.2 |
| 2002/0073845 A1 | 6/2002 | Reddy | |
| 2004/0025908 A1 * | 2/2004 | Douglas et al. | 134/56 R |
| 2004/0148264 A1 | 7/2004 | Megan et al. | |
| 2007/0227352 A1 | 10/2007 | Kumar | |
| 2007/0232706 A1 | 10/2007 | Shah et al. | |
| 2008/0308769 A1 | 12/2008 | Marty et al. | |
| 2009/0094894 A1 | 4/2009 | Genkin et al. | |
| 2009/0099269 A1 | 4/2009 | Rigby et al. | |
| 2009/0117024 A1 | 5/2009 | Weedon et al. | |
| 2009/0298957 A1 | 12/2009 | Gauthier et al. | |
| 2010/0037521 A1 * | 2/2010 | Vakil et al. | 48/127.5 |
| 2010/0129284 A1 * | 5/2010 | Niitsuma et al. | 423/437.1 |
| 2011/0271714 A1 * | 11/2011 | Reddy et al. | 62/636 |

FOREIGN PATENT DOCUMENTS

| | | |
|---|---|---|
| WO | 2006097703 | 9/2006 |
| WO | 00/27505 | 5/2008 |
| WO | 2008123337 | 10/2008 |

OTHER PUBLICATIONS

PCT Search Report and Written Opinion for PCT/US2010/030445.

Nyserda, "Hydrogen Production—Steam Methan Reforming (SMR)", Hydrogen Fact Sheet, New York Power Authority, Albany, NY, www.nyserda.org.

U.S. Appl. No. 12/570,361, filed Sep. 30, 2009.

* cited by examiner

Figure 1: First Embodiment

Figure 2: Second Embodiment

PROCESSES FOR THE RECOVERY OF HIGH PURITY HYDROGEN AND HIGH PURITY CARBON DIOXIDE

CROSS-REFERENCE TO RELATED APPLICATIONS

This application claims the benefit of U.S. Provisional Application No. 61/179,225, filed May 18, 2009, the entire contents of which are incorporated herein by reference.

FIELD OF THE INVENTION

The present invention relates to various processes for recovering high purity carbon dioxide from waste gas streams produced during the hydrogen purification step of a steam hydrocarbon reforming unit/water gas shift reactor/$H_2$ pressure swing adsorption unit process.

BACKGROUND

Interest in the recovery of carbon dioxide (hereinafter "$CO_2$") from various $CO_2$ containing gas mixtures has increased due to a variety of factors including the merchant $CO_2$ market, enhanced oil recovery (hereinafter "EOR") and greenhouse gas emissions reduction. The currently available systems for recovering high purity $CO_2$ use a variety of generic and proprietary physical and chemical solvents. Accordingly, the processes utilized for this recovery require a large investment due to equipment costs and also high regeneration energy requirements.

Carbon dioxide containing gas mixtures are produced as waste streams during the production of hydrogen gas from hydrocarbon streams using standard steam hydrocarbon reforming processes (hereinafter "SHR"). The most preferred of the SHR processes involves the production of hydrogen gas from hydrocarbon streams using steam methane reforming (hereinafter "SMR" processes since methane has a higher proportion of hydrogen than other hydrocarbons. More specifically with regard to general SMR processes, a hydrocarbon feed gas is fed into a SMR device where the methane in the feed gas reacts with steam at high temperatures (from about 700° C. to about 1100° C.) in the presence of a metal-based catalyst to produce a mixture of carbon monoxide and hydrogen. The hydrogen yield of this mixture is increased by passing the resulting mixture through a water gas shift reactor which promotes the conversion of carbon monoxide and water into more hydrogen and accordingly a stream that is rich in hydrogen but also contains to a lesser degree carbon dioxide, methane and carbon monoxide. Such units typically operate at a temperature from about 200° C. to about 500° C. In some cases the stream from the SHR will be at a higher temperature so optionally the stream may first be cooled with a heat exchanger before being passed through the water gas shift. The hydrogen rich stream produced is then passed through a $H_2$ pressure swing adsorption unit (hereinafter "$H_2$ PSA") in order to allow for the removal of about 90% or more of the hydrogen present through the use of adsorbents. The removal of the hydrogen results in a waste stream (also commonly referred to as "tail gas") that is purged from the $H_2$ PSA that contains methane, carbon monoxide, carbon dioxide, water, and any unrecovered hydrogen. This differs from the SHR units, with the difference being that the waste stream or tail gas produced in the SHR units contains alkanes of varying size ($C_nH_{2n+2}$) and water. The desire has been to be able to utilize these waste streams more efficiently as in the past they have simply been burned as make up fuel (added to the natural gas used in the SHR process or SMR process).

Recently, a $CO_2$ cryogenic process unit (hereinafter "CPU") process was proposed to capture the $CO_2$ during steam methane reforming $H_2$ pressure swing adsorption off gas (by Air Liquide) in WO 2006/054008. In this process, the waste gas from the CPU plant, which normally contains significant amounts of $H_2$, can be recycled back to the SMR plant for additional $H_2$ production credit. The process requires operation at high pressure and cold temperature though. Therefore, while it may be appropriate to use the $CO_2$ CPU process in a very large scale $CO_2$ recovery plant (>1000 TPD), when applying the $CO_2$ CPU process in a small size $CO_2$ recovery plant (typically 100 to 500 TPD merchant $CO_2$ plants), the energy and maintenance costs are considered to be usually high.

Recovery of $CO_2$ from SMR $H_2$ PSA off gas by using an adsorption process has been proposed by the BOC Group in U.S. Pat. No. 4,963,339 and U.S. Pat. No. 5,000,025 wherein the $CO_2$ was removed using a $CO_2$ PSA unit. To produce food grade $CO_2$ from a $CO_2$ lean stream a two stage process was used with the first stage being a $CO_2$ vacuum swing adsorption (hereinafter "VSA") or PSA process. In the first PSA or VSA stage, a $CO_2$ lean stream containing <50% $CO_2$ was upgraded to a high concentration $CO_2$ mixture (>90% $CO_2$). This high concentration $CO_2$ mixture was then sent to a second stage which was a standard $CO_2$ liquefaction plant. Therefore, a food grade $CO_2$ product was produced. On the other hand, the $CO_2$ VSA/PSA process normally generates another $CO_2$ lean product. Typically this $CO_2$ lean product contains over 35% $H_2$, 20% $CH_4$ and 15% CO with a balance of $CO_2$ which was sent to the reformer as fuel in current designs.

There exists a need to provide a process for recovering high purity gaseous hydrogen and high purity gaseous carbon dioxide from the gas stream produced using steam hydrocarbon reforming, especially steam methane reforming. There also exists a need for a process for treating the waste gas stream obtained from a $H_2$ PSA unit under optimum conditions in order to allow for the recovery of a high quantity of high purity gaseous carbon dioxide.

SUMMARY OF THE INVENTION

The present invention relates to various processes for recovering high purity gaseous hydrogen and high purity gaseous carbon dioxide from the gas stream produced using steam hydrocarbon reforming, especially steam methane reforming, utilizing a $H_2$ pressure swing adsorption unit followed by either a $CO_2$ vacuum swing adsorption unit or a $CO_2$ vacuum swing adsorption unit in combination with an additional $CO_2$ pressure swing adsorption unit. By using an uncoupled $H_2$ PSA and CO, VSA unit it is possible to produce high purity $H_2$ and high purity $CO_2$. The present invention further relates to a process for optimizing the recovery of $CO_2$ from waste gas streams produced during the hydrogen purification step of a steam hydrocarbon reforming/$H_2$ pressure swing adsorption unit utilizing either a $CO_2$ vacuum swing adsorption unit or a $CO_2$ vacuum swing adsorption unit in combination with a $CO_2$ pressure swing adsorption unit. The present invention even further relates to the apparatus necessary to carry out the various processes of the present invention.

DETAILED DESCRIPTION OF THE INVENTION

By integrating a $CO_2$ vacuum swing adsorption (hereinafter "$CO_2$ VSA") unit or a $CO_2$ VSA unit in combination with an additional CO2 pressure swing adsorption (hereinafter "CO2 PSA") unit with a SHR unit, a water gas shift reactor (hereinafter "WGS") reactor, and a $H_2$ PSA unit, it is possible to arrive at processes for producing not only high purity hydrogen gas but also in the same scheme high purity carbon dioxide gas thereby overcoming many of the disadvantages of prior art $H_2/CO_2$ recovery processes. The proposed integrated processes of the present invention involve two different embodiments which include: 1) the use of a $CO_2$ VSA unit in conjunction with a SHR unit, a WGS reactor, and a $H_2$ PSA unit or 2) the use of a $CO_2$ VSA unit and an additional $CO_2$ PSA unit in conjunction with a SHR unit, a WGS reactor, and a $H_2$ PSA unit in order to recover additional $CO_2$ that would normally be used for other purposes such as the makeup fuel for the SHR unit of the SHR unit/$H_2$ PSA unit scheme.

One advantage of the present invention is that these process configurations are suitable for the recovery of $CO_2$ from mixtures containing not only high levels of $CO_2$ but also low levels of $CO_2$ (also referred to herein as "lean" $CO_2$ mixtures). More specifically, the present processes are proposed for use in areas where conventional $CO_2$ sources are not available for the merchant $CO_2$ market. As used herein, the phrase "merchant $CO_2$ market" refers to the $CO_2$ market which involves the removal of $CO_2$ from gas streams and the subsequent sale/use of this purified $CO_2$. The various process embodiments of the present invention not only deliver merchant CO, product economically at a small scale but may also be potentially useful on a large scale. The main benefit of using these integrated processes are that they allow for improved recovery of high purity $CO_2$. In addition, in certain embodiments, depending upon the conditions utilized and the feed gas streams utilized, it may be possible to increase overall $H_2$ recovery and to enhance plant operation, flexibility, and reliability.

Figure 1:
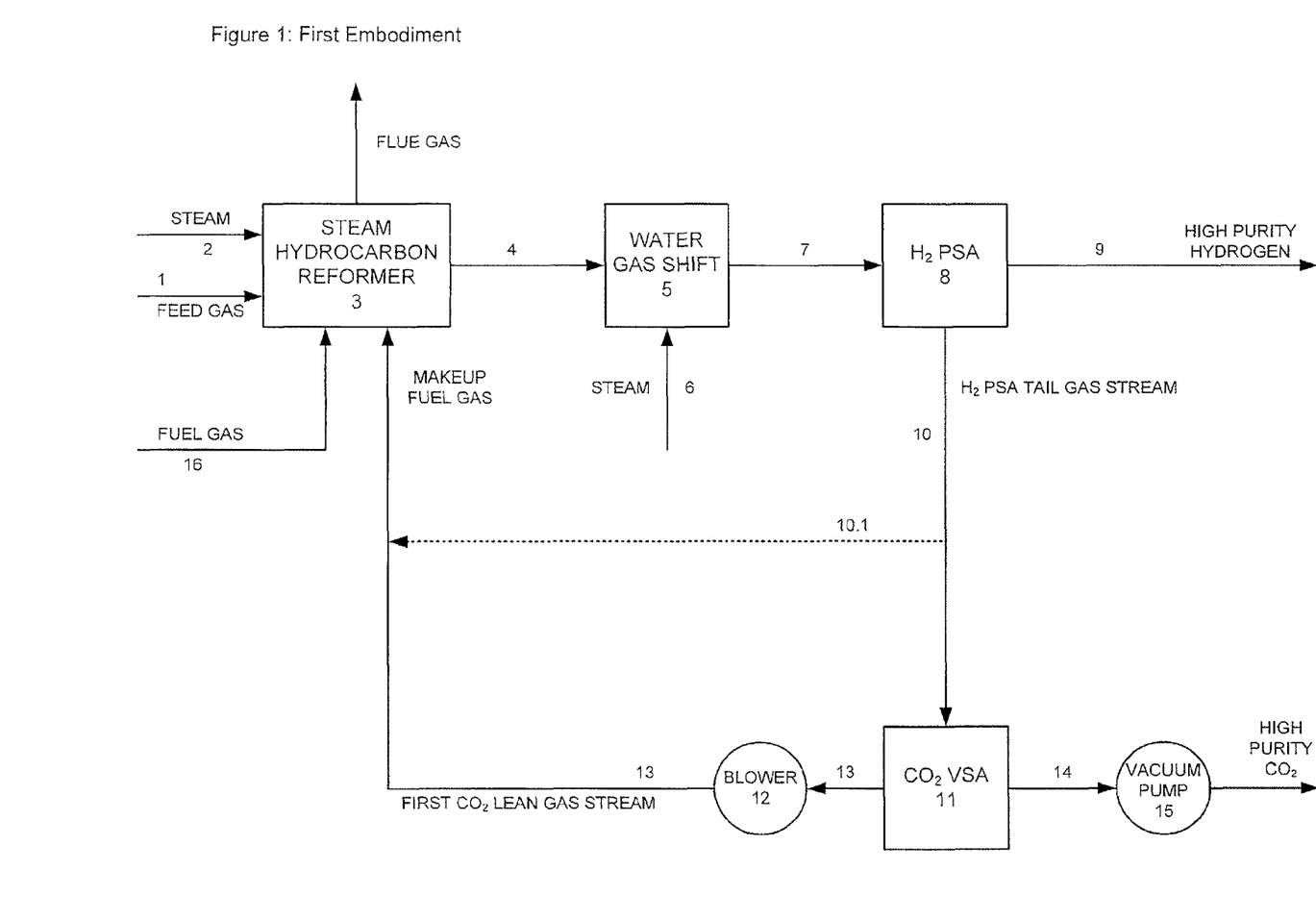
FIG. 1 provides a schematic of one embodiment of the present invention which allows for treatment of the hydrogen pressure swing adsorption tail gas in a vacuum swing adsorption unit.
Figure 2:
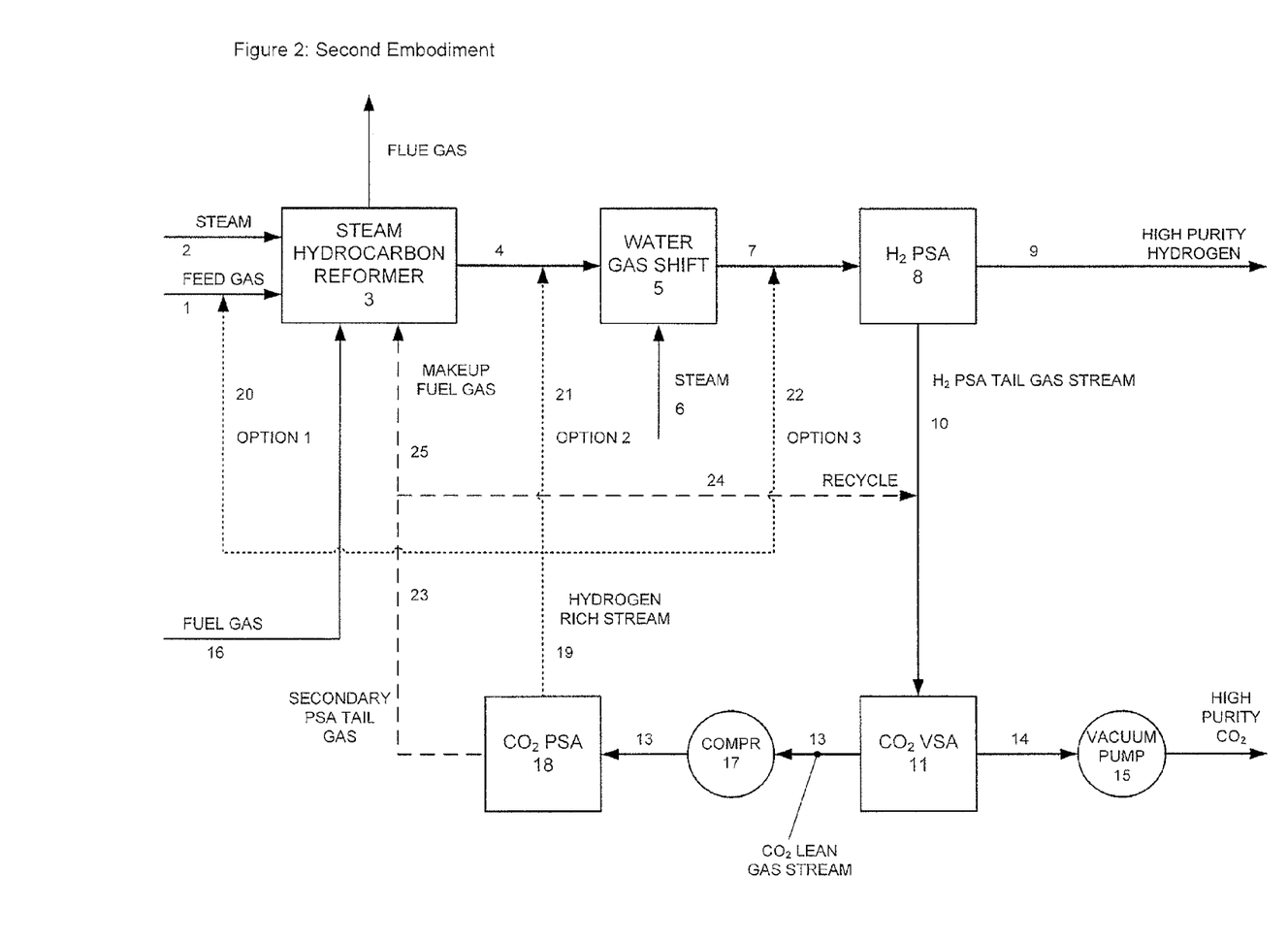
FIG. 2 provides a schematic of an alternative embodiment the present invention which allows for treatment of the hydrogen pressure swing adsorption tail gas in a vacuum swing adsorption unit followed by treatment of the carbon dioxide lean gas stream produced in the vacuum swing adsorption unit in a secondary pressure swing adsorption unit.

As can be seen from the Figures, the overall processes of the present invention involve recovering high purity gaseous hydrogen and high purity gaseous carbon dioxide. As shown in FIG. 1 and FIG. 2, the first stage of each of these processes involves the introduction of one or more hydrocarbon streams (also referred to herein as one or more hydrocarbon feed gases) 1 along with steam 2 into a SHR unit 3. Prior to being introduced into the actual reformer of the SHR unit 3, the one or more hydrocarbon streams 1 are typically compressed (not shown), e.g. to about 200 to 600 psig, and combined with high pressure steam 2, which is at about 700 psig, before entering the SHR unit 3. The SHR unit 3 conventionally contains tubes (not shown) packed with catalyst (typically a nickel catalyst) through which the steam 2/hydrocarbon stream 1 mixture passes. An elevated temperature of about 860° C. is typically maintained to drive the reaction which is endothermic. As used herein, the phrase "steam hydrocarbon reformer unit" or "SHR unit" refers not only to the reformer, but also to all of the additional components that typically are considered to make up a steam hydrocarbon reformer, including, but not limited to, one or more components selected from heat exchangers, pre-reformer units, the reformer, tubes with one or more types of catalyst, etc. Note that a steam methane reformer unit (also referred to herein as a SHR unit) is considered to be a specific type of SHR unit and is generally the preferred type of SHR unit. The reaction product from the SHR unit (hereinafter "SHR product stream") is principally a hydrogen rich effluent that contains hydrogen, carbon monoxide, methane, water and carbon dioxide in proportions close to equilibrium amounts at the elevated temperature and pressure. In certain embodiments where there is a high amount of carbon monoxide in the SHR product stream (which depends upon the actual composition of the initial hydrocarbon streams injected into the SHR unit), the scheme may optionally contain a water gas shift (also referred to herein as "WGS") reactor 5 which functions to form additional hydrogen and carbon dioxide by further reacting or treating the SHR product stream with additional steam in order to obtain a water gas shift effluent. In the embodiment where the WGS reactor 5 is included, the SHR product stream is then introduced via line 4 into the WGS reactor 5 (which can contain a variety of stages or one stage; embodiment with various stages not shown) along with steam which is introduced via line 6 to form additional hydrogen and carbon dioxide. The WGS reactor 5 converts the carbon monoxide to carbon dioxide with the liberation of additional hydrogen by reaction at high temperature in the presence of the additional steam. Combining a SHR unit 3 and a WGS reactor 5 is well known to those of ordinary skill in the art.

The SHR reaction product (in the case where there is no water gas shift reactor) or the water gas shift reaction product (hereinafter "WGS reaction product) is then introduced into a $H_2$ PSA unit 8 via line 7 in order to produce high purity hydrogen. Prior to introduction into the $H_2$ PSA 8, the WGS reaction product (or SHR reaction product when there is no WGS reactor) will typically be cooled down to less than 50° C. and a pressure in the range of 200 to 600 psig. The cooling down step is typically accomplished via a heat exchanger (not shown). The $H_2$ PSA unit 8 utilized can be any $H_2$ PSA unit known in the art and can comprise anywhere from two to twelve adsorption beds (not shown) although more adsorption beds may be utilized. During the process of $H_2$ production, each of the adsorption beds will individually under go a cycle that generally comprises: a) pressurization with pure hydrogen product, b) constant feed and hydrogen product release; c) pressure equalization to transfer high pressure hydrogen-rich void gas to another bed at low pressure, the other bed being about to commence product pressurization; d) depressurization to slightly above atmospheric pressure; e) purge using intermediate product hydrogen; and f) pressure equalization with another bed at higher pressure to accept hydrogen-rich void gas. Note that with regard to the multiple beds, these beds are typically staggered with regard to their point in the process cycle noted (at different steps with regard to one another) in order to allow continuous uninterrupted processing. The type of adsorbents utilized in the adsorbent beds may be any type of adsorbent that is known in the art for such $H_2$ PSA beds. Preferably, the adsorbents used in the $H_2$ PSA 8 include, but are not limited to activated alumina, activated carbon, zeolite and combinations thereof. As a result of this process, two separate gas streams are obtained—one that is a gaseous high purity hydrogen stream that is withdrawn via line 9 where it is passed on for further use and/or storage and the other which is often referred to as a $H_2$ PSA tail gas which is withdrawn after desorption of a bed via line 10 and is subjected to further processing. The $H_2$ PSA tail gas withdrawn from the adsorption beds of the $H_2$ PSA unit 8 during the depressurization and purge steps generally comprises carbon dioxide, methane and carbon monoxide and any remaining hydrogen. The combination of a $H_2$ PSA unit 8 with a SHR unit 3 and an optional WGS reactor 5 is well known to those of ordinary skill in the art and is depicted in each of the embodiments described hereinafter. With regard to the embodiments described hereinafter, the process will be described with reference to a SHR unit 3, a WGS reactor 5, and a H2 PSA unit. However, the same description is applicable for embodiments in which the WGS reactor 5 is not present.

The next step in the process involves the removal of $CO_2$ from the $H_2$ PSA tail gas stream, more specifically for the removal of $CO_2$ from $H_2$ PSA tail gas streams produced as a result of the SHR/WGS/$H_2$ PSA 3/5/8 process. A variety of alternatives are available for the removal of $CO_2$ from this $H_2$ PSA tail gas with each of these comprising the SHR-WGS-H2 PSA scheme described hereinbefore. The present embodiments present alternatives to the prior art which allow for the removal of $CO_2$ from the $H_2$ PSA tail gas stream which would normally be used as makeup fuel for the SHR unit.

As noted above, in the standard SHR/WGS/$H_2$ PSA 3/5/8 scheme, by treating the gas stream that is produced by processing through the SHR unit 3 and WGS reactor 5, it is possible to obtain a gas stream that is rich in hydrogen. As previously noted, this hydrogen rich gas stream is then injected into the $H_2$ PSA unit 8 via line 7 under standard PSA conditions (including standard temperatures and pressures) with the result that a high purity gas stream comprising greater than about 99% hydrogen, preferably in the area of 99.9% hydrogen is obtained. As a result of subjecting this hydrogen rich gas stream from the $H_2$ PSA process, a waste stream that is referred to as a $H_2$ PSA tail gas stream is also obtained. During the $H_2$ PSA process, the high purity gas stream passes through the various beds and the heavier components are adsorbed by the adsorbents in the beds. The resulting $H_2$ PSA tail gas stream is withdrawn from the $H_2$ PSA unit via line 10 after the pressure of the adsorbent bed is decreased (depressurization or desorption) and a purge step thereby releasing the adsorbed components. This $H_2$ PSA tail gas stream typically comprises methane, hydrogen, carbon monoxide, carbon dioxide and water with the amount of each being present typically depending upon the actual feed gas utilized for the SHR/WGS/$H_2$ PSA processes. While not wishing to be restricted by reciting actual ranges of components, typically the $H_2$ PSA tail gas comprises from about 30 to about 60% $CO_2$, more typically from about 40 to about 50% $CO_2$. In the past, regardless of the composition, this $H_2$ PSA tail gas stream was typically used as a makeup fuel to be added to the SHR unit along with natural gas. As a result, there was a loss of valuable $CO_2$.

In the first process embodiment of the present invention as set forth in FIG. 1, rather than use the $H_2$ PSA tail gas stream as a makeup fuel as in the prior art, the $H_2$ PSA tail gas stream is instead treated in order to remove the valuable $CO_2$ present as a high purity CO2 stream. This treatment of the $H_2$ PSA tail gas stream is carried out using a $CO_2$ VSA unit 11. As used herein with regard to the present invention, the term "VSA" refers to a non-cryogenic gas separation technology which utilizes the adsorbents for the removal of certain gases from a gas mixture and vacuum for the removal of the certain gases from the adsorbents. Furthermore, as used herein, the phrase "$CO_2$ VSA unit" refers to a vacuum swing adsorption unit in which vacuum is used along with an adsorbent that is specific to $CO_2$ in order to select for $CO_2$ removal from a gas stream. For the purposes of the present invention, with regard to the $CO_2$ VSA unit, this unit is a separate unit from the $H_2$ PSA unit (the two are uncoupled; not a part of a single unit). Those of ordinary skill in the art will recognize that while it is critical that the VSA unit be utilized in the process of the present invention, the actual configuration of the VSA unit is not necessarily critical provided that the VSA unit comprises two or more static beds of the adsorbent, preferably selected from adsorbents such as a zeolite adsorbent (also referred to as zeolite beds), a silica gel or combinations thereof, preferably from two to four static beds. Accordingly, any VSA unit known in the art which includes at least one or more zeolites as adsorbent in at least two beds may be used for the $CO_2$ VSA unit in the process of the present invention. In an alternative embodiment of the present invention, a silica gel will be used alone or with the zeolite adsorbent where there is not high vacuum pressure available to desorb the adsorbed $CO_2$ from the zeolite adsorbent. In an even further embodiment, an activated alumina can be used with the one or more zeolites and/or silica gel, preferably as a layer to help in the removal of water. Note high vacuum pressure is typically required to desorb adsorbed $CO_2$ from zeolite adsorbent due to high surface affinity. However, the adsorbed $CO_2$ can be relatively easily withdrawn from silica gel adsorbent or a combination of silica gel with zeolite adsorbent in the case where there is no high vacuum pump available. Accordingly, silica gel adsorbent may be an option since both adsorbents may have similar $CO_2$ working capacity if there is no high vacuum pressure available. In as still further embodiment of the present invention, it may be desirable to not treat all of the $H_2$ PSA tail gas. In such cases, a portion of the $H_2$ PSA tail gas may be separated (withdrawn) from the $H_2$ PSA tail gas prior to insertion into the $CO_2$ VSA unit 11 and directed via line 10.1 to be added to line 13 which provides the first $CO_2$ lean gas stream to be used as makeup fuel in the SHR unit 3.

Therefore, the first process embodiment of the present invention provides for the integration of the $CO_2$ VSA unit 11 into the standard SHR/WGS/$H_2$ PSA 3/5/8 scheme. In this process, the $H_2$ PSA tail gas stream that is obtained from the $H_2$ PSA unit 8 portion of the SHR/WGS/$H_2$ PSA 3/5/8 scheme is fed via line 10 at a pressure that is dependent upon the $H_2$ PSA tail gas pressure as it leaves the $H_2$ PSA unit 8 which will typically be less than about 10 psig to a $CO_2$ VSA unit 11 that contains at least two beds of zeolite adsorbent (actual beds not shown) that is specific for $CO_2$ removal. A blower 12 that is positioned down stream of the $CO_2$ VSA unit 11 is used to aid movement of the waste stream (hereinafter referred to as the "first $CO_2$ lean gas stream") from the $CO_2$ VSA unit 11 via line 13 and along line 13. Those of ordinary skill in the art will recognize that a variety of such blowers 12 are available in the art which function to allow for the aid of movement of gas streams from one position to another, including but not limited to, centrifugal blowers or positive displacement blowers. Those of ordinary skill in the art will also recognize that a blower may also be positioned along line 10 just prior to the $CO_2$ VSA unit 11 (not shown). While this position may be utilized, it is less advantageous than the first alternative of the blower 12 down stream from the $CO_2$ VSA unit 11 along line 13 since in this instance, a larger blower may be needed since the blower will be aiding in the movement of a larger quantity of gas (the entire $CO_2$ VSA feed stream).

Once the $H_2$ PSA tail gas stream is introduced into the $CO_2$ VSA unit 11 via line 10 with the assistance of the blower 12 placed downstream of the $CO_2$ VSA unit 11 along line 13, the PSA tail gas stream passes over the one or more zeolite beds (not shown) employed in the $CO_2$ VSA unit 11. By exposing the $H_2$ PSA tail gas stream obtained from the $H_2$ PSA unit 8 of the SHR/WGS/$H_2$ PSA 3/5/8 scheme to a zeolite that is specific for the $CO_2$ in the tail gas stream at near or slightly higher than ambient temperatures and pressures, it is possible to remove a large portion of the $CO_2$ from the tail gas stream in a highly purified state as the $CO_2$ will be taken up (adsorbed) by the zeolite. The $CO_2$ becomes trapped inside of the zeolite adsorbent during the exposure of the $H_2$ PSA tail gas stream to the zeolite and the remaining gases, such as $CH_4$, CO and $H_2$, pass over the zeolite bed due to the lack of affinity of the zeolite for these particular gases and pass on through the $CO_2$ VSA unit 11 and out of the $CO_2$ VSA unit 11 via line 13 as a first $CO_2$ lean gas stream. Note that there will also be some $CO_2$ which passes through with the remaining gases in the first $CO_2$ lean gas stream as the adsorbent removes "a large portion of the $CO_2$", not necessarily all of the $CO_2$. The zeolite, while being specific for $CO_2$, also has an affinity for water. Accordingly, any water that is present may also be taken up by the zeolite. In many instances, the inclusion of water with the $CO_2$ will not prove to be a problem since many of the downstream uses of $CO_2$ will take into account the removal of any water that is present.

As used herein, the phrase "a large portion of the $CO_2$" refers to the removal of greater than 50% of the $CO_2$ present in the $H_2$ PSA tail gas stream while the phrase "in a highly purified state" refers to a purity of greater than 96% $CO_2$ (dry). Accordingly, by using this first process embodiment of the present invention, it is possible to recover over 50% of the $CO_2$ in the $H_2$ PSA tail gas stream with the $CO_2$ recovered having a purity of greater than 96% (dry), preferably greater than 97% (dry), and even more preferably greater than 98% (dry).

The temperature at which the first process embodiment of the present invention is carried out in the $CO_2$ VSA unit will be within the range known in the art. This temperature is typically less than about 60° C.

With regard to the zeolites utilized in the $CO_2$ VSA unit of the first process embodiment of the present invention, the term "zeolite" refers to any one or more zeolites (including mixtures) that are selective for $CO_2$ while at the same time having minimal to no selectivity for the remaining components in the gas mixture (in the ease of a SMR/WGS/$H_2$ PSA 3/5/8 configuration, methane, hydrogen, and carbon monoxide). In other words, the selected zeolite material should have a higher affinity to $CO_2$ than other gas components in the gas mixture. Preferably, the zeolite utilized is selected from molecular sieves, more preferably molecular sieves selected from the group consisting of A type, Y type and X type, and most preferably from 13X molecular sieves. Within the VSA unit utilized, preferably the unit will comprise from 2 to 4 beds in which the one or more zeolites are fixed (typically a fixed static bed). Those of ordinary skill in the art will recognize that the actual configuration of the zeolites within the beds may take on a variety of different forms and shapes. More specifically, the one or more zeolites utilized may be in the form of layered or radial beds. In addition, in order to remove water from the $H_2$ PSA tail gas stream, there may be present in the bed activated alumina which may be positioned with regard to the zeolite in a layer as in the case when more than one zeolite is present. In addition, those of ordinary skill in the art will also recognize that other types of adsorbents may be utilized in the VSA unit such as silica gels and activated carbon but that the preferred and most efficient adsorbents are zeolites.

As noted above, when the $H_2$ PSA tail gas stream obtained from the $H_2$ PSA unit 8 is passed over the zeolite bed that contains zeolite that is specific for $CO_2$, a large portion of the $CO_2$ adsorbs to the zeolite and the remaining gas exits the VSA unit 11 via line 13. The remaining gas components which make up the stream (the first $CO_2$ lean gas stream that typically comprises methane, hydrogen, carbon monoxide and some small amount of carbon dioxide) will exit the VSA unit 11. While one objective of the present invention is to remove as much $CO_2$ as possible, the main objective of the process is to obtain high purity $CO_2$. Accordingly, with the present process, the first $CO_2$ lean gas stream will still contain some carbon dioxide after the tail gas stream from the $H_2$ PSA unit 8 is passed through the $CO_2$ VSA unit 11 and over the zeolite that is selective for $CO_2$. In this first embodiment, the first $CO_2$ lean gas stream obtained is recycled to the SHR unit 3 via line 13 as a fuel (a makeup fuel) to be used in conjunction with a fuel gas, such as a natural gas, supplied via line 16.

Once the first lean $CO_2$ gas stream exits the $CO_2$ VSA unit via line 13, a vacuum pump 15 is used to desorb the adsorbed $CO_2$ and to draw the resulting $CO_2$ rich stream (>96% $CO_2$ (dry)) from the $CO_2$ VSA unit 11 via line 14. This $CO_2$ rich stream recovered from the zeolite may then be sent to a $CO_2$ liquefaction unit (not shown) in order to produce a food grade $CO_2$ product.

In the second process embodiment of the present invention as shown in FIG. 2, the process is carried out in the same manner as described hereinbefore with regard to the first process embodiment depicted in FIG. 1, with the exception that an additional step is added to the first process embodiment allowing for the $CO_2$ lean gas stream to be further treated to expanded use of the components contained in the $CO_2$ lean gas stream in the $CO_2$ VSA unit 11. In this additional step, a compressor 17 is used to compress the first $CO_2$ lean gas stream to a pressure that is higher than the SHR operating pressure (which is typically from about 200 to about 600 psig). Note that an optional blower 12 (not depicted in FIG. 2) such as that used in the first embodiment may be positioned just prior to the $CO_2$ VSA unit 11 on line 10 to aid in the movement of the gas stream through the $CO_2$ VSA unit 11 and along line 13 to compressor 17. The compressed $CO_2$ lean gas stream is then fed to a secondary PSA unit 18 which contains two or more beds of an adsorbent which are specific for $CO_2$, such as silica gel or activated carbon, thereby allowing much of the remaining $CO_2$ to be adsorbed on to the adsorbent (hereinafter "$CO_2$ PSA unit"). In the preferred alternative of this second process embodiment, the adsorbent utilized is an activated carbon adsorbent. As a result of the $CO_2$ PSA unit 18 treatment, two separate gas streams are obtained—a secondary gaseous hydrogen rich stream which is removed through line 19 and a secondary $CO_2$ PSA tail gas that is removed through line 23. As noted above with regard to the description of the $H_2$ PSA process aspects, the $H_2$ rich stream exits the secondary $CO_2$ PSA unit 18 via line 19 and is recycled to be included in either 1) the feed gas stream 1 that is injected into the SHR unit 3 (via lines 19 and 20); 2) the SHR product stream feed gas that exits the SHR unit 3 via line 4 and is injected into the WGS reactor 5 (via lines 19 and 21); or 3) the WGS reaction product stream that results from the WGS treatment and is injected into the $H_2$ PSA unit (via lines 19 and 22). By recycling the hydrogen rich gas stream obtained in this manner, the result is an increase in the production of high purity $H_2$ from the first $H_2$ PSA unit 8. As in the first embodiment of the present invention, it may be desirable to not treat all of the $H_2$ PSA tail gas. In such cases, a portion of the $H_2$ PSA tail gas may be separated (withdrawn) from the $H_2$ PSA tail gas prior to insertion into the $CO_2$ VSA unit 11 and directed to be added to line 13 (not shown) which provides the first $CO_2$ lean gas stream to be used as makeup fuel in the SHR unit 3.

The PSA unit utilized as the secondary $CO_2$ PSA unit 18 can be a standard PSA unit such as the PSA unit utilized for hydrogen recovery that contains from two to twelve or more adsorption beds. However, as the stream to be treated at this point is smaller than the stream that is treated in the $H_2$ PSA unit 8, typically, this secondary $CO_2$ PSA unit 18 will be smaller in size. In addition, the design complexity of the secondary $CO_2$ PSA unit 18 will often be determined based on the desired end uses of the gas streams produced as well as the degree of purity desired for each of these gas streams.

As a result of this secondary $CO_2$ PSA unit 18 treatment, as long as the pressure in the two or more beds is maintained at the level noted above (about 200 to 600 psi), the remaining components of the $CO_2$ lean gas stream remain adsorbed onto the adsorbent. However, these components become desorbed by reducing the bed pressure and can be drawn from the secondary $CO_2$ PSA unit 18 as a secondary $CO_2$ PSA tail gas via line 23. Typically, this secondary $CO_2$ PSA tail gas will be low in quantity but rich in $CO_2$. The enriched $CO_2$ desorbed stream (secondary $CO_2$ PSA tail gas stream) can be either recycled back to the $CO_2$ VSA unit 11 as feed via lines 23 and 24 or returned back to the SHR unit 3 as a makeup fuel via lines 23 and 25. The choice of routes will typically be dependent on the $CO_2$ concentration of the mixture. With regard to the alternative in which the secondary $CO_2$ PSA tail gas is recycled and added to the $H_2$ PSA tail gas stream to be further injected into the $CO_2$ VSA unit (where it serves as additional feed for the $CO_2$ VSA unit), this recycle improves the efficiency of the high purity $CO_2$ recovery as a result of the $CO_2$ VSA unit treatment.

With regard to the first and second embodiments noted above, it is possible to include a dryer system (not shown) that will be installed just prior to the $H_2$ PSA unit 8 (along line 7 between the WGS unit 5 and the $H_2$ PSA unit 8) in order to remove moisture from the gas stream to be injected into the $H_2$ PSA unit 8 (the gas stream that is rich in hydrogen). Such dryer systems are readily known to those of skill in the art. This dryer system in turn aids in the production of a dry high purity $CO_2$ rich stream from the $CO_2$ VSA unit 11 that will be sent to a liquefaction plant (not shown) via line 14. With regard to these first two embodiments, it would also be possible to regenerate the dryer using the $CO_2$ lean stream that is produced as a result of the $CO_2$ VSA 11 treatment (regeneration of dryer alternative not shown). Accordingly, a portion of the $CO_2$ lean stream can be pulled of prior to being recycled to the SHR unit 3 in the first process embodiment or prior to being compressed in the compressor 17 in the second process embodiment. Note that reducing the moisture content of the $H_2$ PSA tail gas by installing a dryer before the $H_2$ PSA unit 8 is not critical to the present invention as $CO_2$ VSA process and many commercial $CO_2$ plants downstream are designed to handle feed gas that is at close to atmospheric pressure and saturated with water vapor at 100° F. to 150° F. On the other hand, if the $CO_2$ feed gas moisture content can be reduced to liquid $CO_2$ product levels (preferably less than about 5 ppm), $CO_2$ plant dryers could be eliminated and the use of stainless steel (to resist carbonic acid corrosion) in the $CO_2$ plant could be significantly reduced if not completely eliminated.

The present invention further comprises the various systems discussed hereinbefore with regard to the noted processes.

Simulation Example

A simulation example for a $CO_2$ VSA case was carried out using an Adsim simulator (commercially available from Aspen Tech)

In this simulation, a wet $CO_2$ containing feed gas from a $H_2$ PSA tail gas stream was utilized. Specifications of $H_2$ PSA tail gas:

| | |
|---|---|
| Pressure | 0.3 bar (g) |
| Temperature | 35° C. |

Average gas composition (kmol/kmol)

| | |
|---|---|
| CO | 0.1313 |
| $CO_2$ | 0.4742 |
| $H_2O$ | 0.0090 |
| $N_2$ | 0.0130 |
| $CH_4$ | 0.1067 |
| $H_2$ | balance |

Adsorbent in $CO_2$ VSA bed was in multiple layers:

| | |
|---|---|
| Zeolite (13X) | 80% |
| Activated alumina | 20% |

The simulation was conducted based on a 6 steps VSA cycle with 4 adsorbent beds, each of the adsorbent beds being as noted above.

The VSA feed gas pressure (after blower) was 0.45 bar (g)
Vacuum pump suction pressure was 150 mbar
$CO_2$ product composition (kmol/kmol) based on simulation:

| | |
|---|---|
| CO | 0.0184 |
| $CO_2$ | 0.9490 |
| $H_2O$ | 0.0253 |
| $N_2$ | 1.0e-4 |
| $CH_4$ | 0.0069 |
| $H_2$ | balance |

Utilizing the simulation, $CO_2$ product recovery was 69%. Based on the simulation, the conclusion was that high purity $CO_2$ product can be produced by the VSA process regardless of the moisture contained in the feed stream. Wet $H_2$ PSA tail gas may directly be used as the VSA feed. Therefore, a low pressure dryer package may not be needed. In addition, an alumina layer can be used to stop water propagation into zeolite, although a single 13X layer may also be applied.

ELEMENTS

1 feed gas (hydrocarbon stream)
2 steam injection to SHR
3 steam hydrocarbon reformer
4 line from SHR to water gas shift
5 water gas shift
6 steam injection to water gas shift
7 line from water gas shift to $H_2$ PSA
8 $H_2$ PSA
9 line for removal of high purity hydrogen
10 line for removal of $H_2$ PSA tail gas
11 $CO_2$ VSA
12 blower
13 line from which lean gas stream exits $CO_2$ VSA
14 line form which high purity $CO_2$ stream exits $CO_2$ VSA
15 vacuum pump
16 fuel gas line for SHR
17 compressor
18 secondary PSA unit
19 line where hydrogen rich stream exits secondary PSA unit 20 line where hydrogen rich stream is recycled to the SHR unit as feed
21 line where hydrogen rich stream is recycled to the WGS unit
22 line where the hydrogen rich stream is recycled to the $H_2$ PSA
23 line where the secondary lean $CO_2$ gas stream is withdrawn
24 line where the secondary lean $CO_2$ gas stream is recycled to the $CO_2$ VSA
25 line where the secondary lean $CO_2$ gas stream is recycled as makeup fuel for the SHR
26 $CO_2$ PSA

What is claimed is:

1. A process for recovering high purity gaseous hydrogen and high purity gaseous carbon dioxide, the process comprising the steps of:
    a) generating a hydrogen rich effluent that also contains carbon monoxide, carbon dioxide, methane and water from one or more hydrocarbon feed gases in a steam hydrocarbon reformer;
    b) treating the hydrogen rich effluent in a water gas shift reactor in order to further enrich the hydrogen rich effluent and also increase the carbon dioxide content in the hydrogen rich effluent thereby obtaining a water shift effluent, wherein said water shift effluent has a temperature of less than 50C and a pressure of between 200 psig and 600 psig;
    c) introducing the water shift effluent into a hydrogen pressure swing adsorption unit having two or more beds that contain one or more adsorbents that allow for the recovery of a high purity gaseous hydrogen stream and the adsorption of carbon dioxide, carbon monoxide, methane, water and the remaining hydrogen onto the adsorbents in the two or more beds;
    d) withdrawing the high purity gaseous hydrogen from the hydrogen pressure swing adsorption unit and passing this stream on for further use;
    e) depressurizing the two or more beds that contain the adsorbent in order to release the carbon dioxide, carbon monoxide, methane, water and the remaining hydrogen adsorbed thereto and produce a hydrogen pressure swing adsorption tail gas;
    f) withdrawing the hydrogen pressure swing adsorption tail gas from the hydrogen pressure swing adsorption unit and with the aid of a blower and introducing the hydrogen pressure swing adsorption tail gas into a vacuum swing adsorption unit that contains one or more beds of an adsorbent selected from zeolites, silica gels, activated alumina or mixtures thereof that are selective for carbon dioxide thereby allowing for the recovery of a high purity gaseous carbon dioxide by adsorption to the adsorbent and a first carbon dioxide lean gas stream that contains methane, hydrogen, carbon monoxide and the remaining carbon dioxide;
    g) allowing the first carbon dioxide lean gas stream to pass from the vacuum swing adsorption unit where it is recycled to the steam hydrocarbon reformer where it can used as makeup fuel gas in the steam hydrocarbon reformer; and
    h) vacuum desorbing the carbon dioxide from the adsorbent in the vacuum swing adsorption unit in order to produce a high purity gaseous carbon dioxide stream that may be passed on for further use.

2. The process of claim 1, wherein the blower of step f) is positioned after the VSA unit and aids in pulling the hydrogen pressure swing adsorption tail gas through the VSA unit.

3. The process of claim 1, wherein the blower of step f) is positioned before the VSA unit and aids in introducing the hydrogen pressure swing adsorption tail gas into the VSA unit.

4. A process for treating a hydrogen pressure swing adsorption tail gas stream that contains hydrogen, carbon monoxide, carbon dioxide, methane and water in order to recover high purity carbon dioxide from the tail gas stream, said process comprising the steps of:
    a) introducing the hydrogen pressure swing adsorption tail gas with the aid of a blower into a vacuum swing adsorption unit that contains one or more beds of an adsorbent that is selected from zeolites, silica gels, activated alumina and mixtures thereof that are selective for carbon dioxide thereby allowing for the recovery of a high purity gaseous carbon dioxide by adsorption of a large portion of the carbon dioxide to the adsorbent and a first carbon dioxide lean gas stream that contains methane, hydrogen, carbon monoxide and the remaining carbon dioxide;
    b) allowing the first carbon dioxide lean gas stream to pass from the vacuum swing adsorption unit where it is recycled for use as a makeup fuel; and
    c) vacuum desorbing the carbon dioxide from the adsorbent in the vacuum swing adsorption unit in order to produce a high purity gaseous carbon dioxide stream, wherein the feed to the hydrogen pressure swing adsorber has a temperature of less than 50C and a pressure of between 200 psiq and 600 psiq.

5. The process of claim 4, wherein the blower of step a) is positioned after the VSA unit and aids in pulling the hydrogen pressure swing adsorption tail gas through the VSA unit.

6. The process of claim 4, wherein the blower of step a) is positioned before the VSA unit and aids in introducing the hydrogen pressure swing adsorption tail gas into the VSA unit.

7. The process of claim 4, wherein the adsorbent is a zeolite that is a molecular sieve adsorbent.

8. The process of claim 7, wherein the molecular sieve adsorbent is 13X zeolite.

9. A process for recovering high purity gaseous hydrogen and high purity gaseous carbon dioxide, the process comprising the steps of:
    a) generating a hydrogen rich effluent that also contains carbon monoxide, carbon dioxide, methane and water from one or more hydrocarbon feed gases in a steam hydrocarbon reformer;
    b) treating the hydrogen rich effluent in a water gas shift reactor in order to further enrich the hydrogen rich effluent and also increase the carbon dioxide content in the hydrogen rich effluent thereby obtaining a water shift effluent, wherein said water shift effluent has a temperature of less than 50C and a pressure of between 200 psiq and 600 psiq;
    c) introducing the water shift effluent into a hydrogen pressure swing adsorption unit having two or more beds that contain one or more adsorbents that allow for the recovery of a high purity gaseous hydrogen stream and the adsorption of carbon dioxide, carbon monoxide, methane, water and the remaining hydrogen onto the adsorbents in the two or more beds;
    d) withdrawing the high purity gaseous hydrogen from the hydrogen pressure swing adsorption unit and passing this stream on for further use;
    e) depressurizing the two or more beds of the hydrogen pressure swing adsorption unit that contain the adsorbent in order to release the carbon dioxide, carbon monoxide, methane, water and the remaining hydrogen adsorbed thereto and produce a hydrogen pressure swing adsorption tail gas;

f) withdrawing the hydrogen pressure swing adsorption tail gas from the hydrogen swing adsorption unit and introducing the hydrogen pressure swing adsorption tail gas into a vacuum swing adsorption unit that contains two or more beds of an adsorbent selected from zeolites, silica gels, activated aluminas and mixtures thereof that are selective for carbon dioxide thereby allowing for the recovery of a high purity gaseous carbon dioxide by adsorption to the adsorbent and a first carbon dioxide lean gas stream that contains methane, hydrogen, carbon monoxide and the remaining carbon dioxide;

g) allowing the first carbon dioxide lean gas stream to pass from the vacuum swing adsorption unit to a compressor where the first carbon dioxide lean gas stream is compressed to a pressure that is higher than the pressure of the steam hydrocarbon reformer before being fed to a secondary pressure swing adsorption unit that contains two more beds that include activated carbon thereby allowing for the production of a secondary high purity hydrogen stream and a secondary pressure swing adsorption tail gas;

h) vacuum desorbing the carbon dioxide from the adsorbent in the vacuum swing adsorption unit in order to produce a high purity gaseous carbon dioxide rich stream;

i) withdrawing the high purity hydrogen stream from the secondary pressure swing adsorption unit and recycling the high purity hydrogen stream to either the feed gas of the steam hydrocarbon reformer, the hydrogen rich effluent that is withdrawn from the steam hydrocarbon reformer to be injected into the water gas shift reactor, or the water shift effluent to be injected into the hydrogen pressure swing adsorption unit;

j) depressurizing the two or more beds of the secondary pressure swing adsorption unit to allow for the withdrawal of the secondary pressure swing adsorption tail gas; and k) recycling the secondary pressure swing adsorption tail gas to the steam hydrocarbon reformer as makeup fuel or to the hydrogen pressure swing adsorption tail gas stream to be injected into the carbon dioxide vacuum swing adsorption unit.

10. A process for treating a hydrogen pressure swing adsorption tail gas stream that contains hydrogen, carbon monoxide, carbon dioxide, methane and water in order to recover high purity carbon dioxide from the tail gas stream, said process comprising the steps of:

a) introducing the hydrogen pressure swing adsorption tail gas into a vacuum swing adsorption unit that contains two or more beds of an adsorbent selected from zeolites, silica gels, activated aluminas and mixtures thereof that are selective for carbon dioxide thereby allowing for the recovery of a high purity gaseous carbon dioxide by adsorption to the adsorbent and a first carbon dioxide lean gas stream that contains methane, hydrogen, carbon monoxide and the remaining carbon dioxide;

b) allowing the first carbon dioxide lean gas stream to pass from the vacuum swing adsorption unit to a compressor where the first carbon dioxide lean gas stream is compressed to a pressure that is higher than the pressure of the steam hydrocarbon reformer before being fed to a secondary pressure swing adsorption unit that contains two more beds that include activated carbon thereby allowing for the production of a secondary high purity hydrogen stream and a secondary pressure swing adsorption tail gas;

c) vacuum desorbing the carbon dioxide from the adsorbent in the vacuum swing adsorption unit in order to produce a high purity gaseous carbon dioxide rich stream;

d) withdrawing the high purity hydrogen stream from the secondary pressure swing adsorption unit and recycling the high purity hydrogen stream to either the feed gas of the steam hydrocarbon reformer, the hydrogen rich effluent that is withdrawn from the steam hydrocarbon reformer and injected into the water gas shift reactor, or the water shift effluent to be injected into the hydrogen pressure swing adsorption unit;

e) depressurizing the two or more beds of the secondary pressure swing adsorption unit to allow for the withdrawal of the secondary pressure swing adsorption tail gas; and f) recycling the secondary pressure swing adsorption tail gas to the steam hydrocarbon reformer as makeup fuel or to the hydrogen pressure swing adsorption tail gas stream to be injected into the carbon dioxide vacuum swing adsorption unit, wherein the feed to the hydrogen pressure swing adsorber has a temperature of less than 50C and a pressure of between 200 psig and 600 psig.

11. A system for recovering high purity gaseous hydrogen and high purity gaseous carbon dioxide, the system comprising:

a) a steam hydrocarbon reformer that generates a hydrogen rich effluent that also contains carbon monoxide, carbon dioxide, methane and water from one or more hydrocarbon feed gases;

b) a water gas shift reactor for treating the hydrogen rich effluent to convert the carbon monoxide present in the hydrogen rich effluent to carbon dioxide to obtain a water shift effluent and a means for passing the hydrogen rich effluent from the steam hydrocarbon reformer to the water gas shift reactor, wherein said water shift effluent has a temperature of less than 50C and a pressure of between 200 psig and 600 psig;

c) a hydrogen pressure swing adsorption unit having two or more beds that contain one or more adsorbents that allow for the recovery of a high purity gaseous hydrogen stream and a hydrogen pressure swing adsorption tail gas that contains the carbon dioxide, carbon monoxide, methane, water and the remaining hydrogen from the water shift effluent of the water gas shift reactor and a means for passing the water shift effluent from the water gas shift reactor to the hydrogen pressure swing adsorption unit;

d) a vacuum swing adsorption unit that contains one or more beds of an adsorbent selected from zeolites, silica gels, activated aluminas and mixtures thereof that are selective for carbon dioxide thereby allowing for the recovery of a high purity gaseous carbon dioxide by adsorption to the adsorbent and a first carbon dioxide lean gas stream that contains methane, hydrogen, carbon monoxide and the remaining carbon dioxide and a means for passing the hydrogen pressure swing adsorption tail gas that contains the carbon dioxide, carbon monoxide, methane, water and the remaining hydrogen from the hydrogen pressure swing adsorption unit to the vacuum swing adsorption unit and a means for withdrawing the high purity gaseous hydrogen stream from the two or more beds that contain one or more adsorbents of the hydrogen pressure swing adsorption unit; and e) a means for recycling the first carbon dioxide lean gas stream to pass from the vacuum swing adsorption unit to the steam hydrocarbon reformer where it can be added to natural gas in order to fuel the steam hydrocarbon reformer and a means for desorbing the carbon dioxide from the adsorbent in the vacuum swing adsorption unit in order to produce a high purity gaseous carbon dioxide stream.

12. The system of claim 11, wherein the various means for passing include lines that allow for the passage of the gases and various optional pumps and blowers which assist in the movement of the gases from one point to another.

13. A system for recovering high purity gaseous hydrogen and high purity gaseous carbon dioxide comprising:
   a) a steam hydrocarbon reformer that generates a hydrogen rich effluent that also contains carbon monoxide, carbon dioxide, methane and water from one or more hydrocarbon feed gases;
   b) a water gas shift reactor for treating the hydrogen rich effluent to convert the carbon monoxide present in the hydrogen rich effluent to carbon dioxide to obtain a water shift effluent and a means for passing the hydrogen rich effluent from the steam hydrogen carbon reformer to the water gas shift reactor, wherein said water shift effluent has a temperature of less than 50C and a pressure of between 200 psig and 600 psiq;
   c) a hydrogen pressure swing adsorption unit having two or more beds that contain one or more adsorbents that allow for the recovery of a high purity gaseous hydrogen stream and a hydrogen pressure swing adsorption tail gas that contains the carbon dioxide, carbon monoxide, methane, water and the remaining hydrogen from the water shift effluent of the water gas shift reactor and a means for passing the water shift effluent from the water gas shift reactor to the hydrogen pressure swing adsorption unit;
   d) a vacuum swing adsorption unit that contains one or more beds of an adsorbent selected from zeolites, silica gels, activated aluminas and mixtures thereof that are selective for carbon dioxide thereby allowing for the recovery of a high purity gaseous carbon dioxide by adsorption to the adsorbent and a first carbon dioxide lean gas stream that contains methane, hydrogen, carbon monoxide and the remaining carbon dioxide and a means for passing the hydrogen pressure swing adsorption tail gas that contains the carbon dioxide, carbon monoxide, methane, water and the remaining hydrogen from the hydrogen pressure swing adsorption unit to the vacuum swing adsorption unit and a means for withdrawing the high purity gaseous hydrogen stream from the hydrogen pressure swing adsorption unit;
   e) a compressor for compressing the first carbon dioxide lean gas stream from the vacuum swing adsorption unit and a means for passing the first carbon dioxide lean gas stream from the vacuum swing adsorption unit to the compressor;
   f) a secondary pressure swing adsorption unit that contains one or more beds that include activated carbon thereby allowing for the production of a secondary high purity hydrogen stream and a secondary pressure swing adsorption tail gas and a means to pass the compressed first carbon dioxide lean gas stream form the compressor to the secondary pressure swing adsorption unit;
   g) a means to withdraw the high purity hydrogen stream from the secondary pressure swing adsorption unit and recycling the high purity hydrogen stream to either feed stream for the steam hydrocarbon reformer, the water gas shift reactor, or the hydrogen pressure swing adsorption unit; and
   i) a means to depressurize the two or more beds of the secondary pressure swing adsorption unit to allow for the withdrawal of the secondary pressure swing adsorption tail gas and a means for recycling the secondary pressure swing adsorption tail gas to be used with natural gas as fuel for the steam hydrocarbon reformer, to the water gas shift reactor or to be included in the water gas shift effluent.

14. The system of claim 13, wherein the various means for passing include lines that allow for the passage of the gases and various optional pumps and blowers which assist in the movement of the gases from one point to another.

* * * * *